Dec. 23, 1947. J. F. DECKER 2,433,205
ELECTRICALLY CONTROLLED AIR VALVE FOR CARBURETORS
Filed May 12, 1944
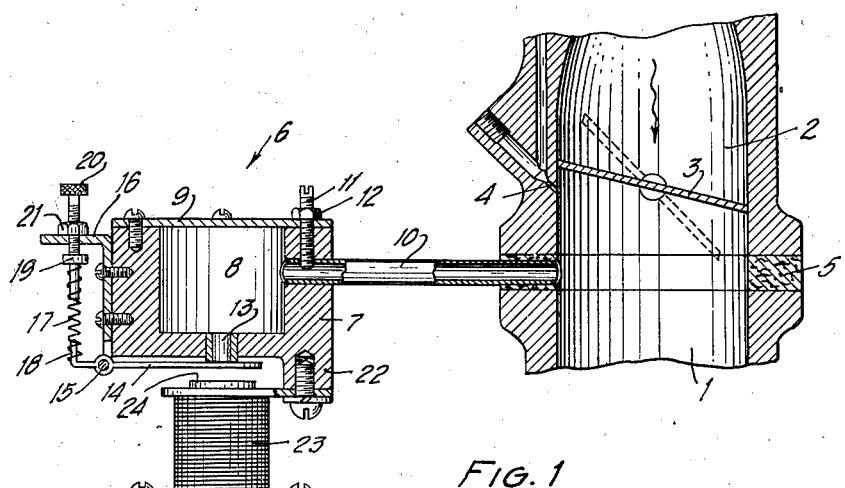
FIG.1
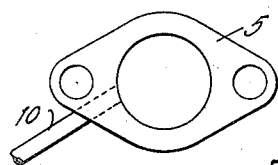
FIG.3
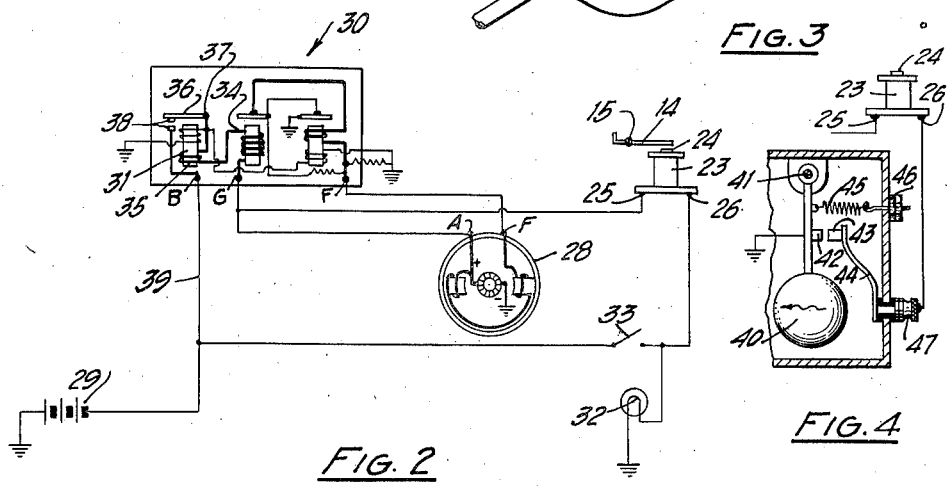
FIG.2     FIG.4
INVENTOR.
John F. Decker
BY
ATTORNEY Patented Dec. 23, 1947

2,433,205

UNITED STATES PATENT OFFICE 2,433,205

ELECTRICALLY CONTROLLED AIR VALVE FOR CARBURETORS

John F. Decker, Albany, N. Y.

Application May 12, 1944, Serial No. 535,369

4 Claims. (Cl. 180—77)

My invention relates to internal combustion engines and particularly to valves for admitting auxiliary air to the intake manifold of an internal combustion engine.

Electrically or magnetically controlled valves have heretofore been proposed for admitting air to the intake manifold of internal combustion engines. However such valves, so far as I am aware, have never functioned very satisfactorily and are not adapted for use with present day carburetors nor for use on present day motor vehicles which are equipped with voltage and current controlled regulators.

When an internal combustion engine is first started, the admission of air, to the intake manifold, other than that passing through the carburetor is extremely undesirable because it destroys the proper mixture of air and gas which is formed in modern carburetors. Furthermore, it interferes with the proper functioning of the accelerator pump and in many instances makes it difficult if not impossible to start the motor. On the other hand, after the motor has warmed up, and particularly at high speed, additional air is very desirable.

The principal object of my invention is to provide a valve for admitting auxiliary air to the intake manifold of an internal combustion engine and means for controlling the operation of the valve so that it does not interfere either with the starting and warming up of the motor, with the normal idling speed thereof or with the functioning of the accelerator pump. Another object is to provide a valve of such character and means for automatically actuating the same so that, upon the initial opening of the valve, there will be a momentary delay in establishing direct communication between the intake manifold and the surrounding atmosphere. Another object is to provide a valve of this type and means for closing the same when the motor is suddenly throttled down, as in the case of stopping a motor vehicle by the application of the brakes. A further object is to provide a device of this character which may be quickly and easily attached to the motor and connected in the electrical system of a motor vehicle without the necessity of making any adjustments in the carburetor. A further object is to provide a device of simple construction, which may be sold and installed at a reasonable price, and which will function efficiently at all times to effect a considerable saving in fuel and increase the top speed of the motor.

I accomplish these objects by means of the novel elements and the combinations and arrangements thereof described below and illustrated in the accompanying drawing in which—

Fig. 1 is a vertical section through my valve with certain portions broken away and illustrating a fragmentary portion of the intake manifold of an internal combustion engine, including a portion of a downdraft carburetor, to which my valve is attached;

Fig. 2 is a diagram illustrating a portion of the electrical wiring system in a motor vehicle with which my valve is associated;

Fig. 3 is a plan view of the gasket between the carburetor and the intake manifold drawn to a reduced size and showing a fragmentary portion of the tube with which my valve is connected; and Fig. 4 is a fragmentary vertical section of an inertia operated switch.

Referring to the drawings—

1 is a fragmentary portion of the intake manifold of an internal combustion engine, and 2 is a fragmentary portion of a downdraft carburetor provided with a throttle 3 and an idling jet 4. Between the intake manifold and the carburetor is a gasket 5 which is substantially thicker than the gasket normally employed in this location and which is preferably formed of "Micarta" or like material. 6 generally represents my valve which comprises a body 7, which may be of almost any suitable substance but is preferably of a molded plastic. The body 7 encloses a space 8 of rather substantial volume, depending somewhat on the size of the engine, which is sealed at the top by the cover 9. For a small passenger car this volume however need not exceed about 6/10 cubic inches. Providing communication between the space 8 and the intake manifold is a tube 10, one end of which may be molded into the gasket 5 and the other end of which projects through the side wall of the body 7 and is secured therein by means of the adjusting screw 11 provided with a lock nut 12. It will be noted that the tube 10 communicates with the intake manifold at a point directly below the idling jet 4. The screw 11 extends down into the tube 10 and by moving it into the tube or withdrawing it therefrom the cross-sectional area of the passage through the tube may be varied. Molded into the bottom of the body 7 is a valve comprising a hollow metal cylinder or ring 13 which projects somewhat below the body 7 and serves as a seat for the valve closure member 14 formed of magnetic material and which is pivoted at 15 to a bracket 16 secured to the side of the body 7. A light helical spring 17 is compressed between the end 18 of the closure element 14 and the enlarged portion 19 of the adjusting screw 20 which is provided with a lock nut 21 abutting the top of the bracket 16. The compression on the spring is adjusted by means of the screw 20 so that the closure element 14 is held very lightly against its seat 13. Thus, the valve opening into the body 7 is normally closed. Secured to a lug 22 on the bottom of the body 7 is an electromagnet 23 having its core 24 within operative range of the closure element 14 which also functions as an armature for the magnet. The terminals of the winding on the electromagnet are electrically connected to the binding posts 25 and 26 which are secured to the base 27 of the magnet.

In Fig. 2 I have illustrated that portion of the electric wiring which is ordinarily directly associated with the generator and battery of a motor vehicle. Thus, 28 is the generator, 29 is the storage battery and 30 represents generally the voltage and current regulator including a cutout or circuit breaker. I make no claim of course to the regulator per se but I utilize the cutout as an element of my invention. 32 is the stop light filament and 33 is the stop light switch which is normally connected to the brake pedal of the vehicle so that, when the brake is applied the switch 33 is closed and the stop light is connected across the battery and illuminated.

I have indicated the terminals of the generator by the letters A and F and the terminals of the regulator by the letters B, G and F because these markings correspond to the markings normally used on these devices to facilitate their connection to each other and the connection of the regulator to the battery. The function of the regulator of course is well understood and is to control the voltage of the generator and prevent it from exceeding a predetermined maximum fixed by the setting of the voltage regulator and to control the current output of the generator and prevent it from exceeding a predetermined maximum determined by the setting of the current regulator.

By reference to Fig. 2 it will be noted that one terminal 26 of the electromagnet 23 is grounded through the stop light filament 32 while the other terminal 25 is connected to terminal G of the regulator. This terminal is connected to the heavy current winding 34 on one of the relays in the regulator which is in series with the heavy winding 35 on the cutout. The winding 35 is connected to the armature of the cutout 36 at 37 so that when the cutout is closed the terminal 25 on the magnet 23 is connected to the battery 29 through the windings just mentioned, the armature 36, the contact points 38 and the conductor 39.

The electromagnet 23 is wound to the proper resistance to work in conjunction with the voltage of the battery used in the electrical system and the cross-sectional area of the valve ring 13. Usually, where a 6 volt system is used with a valve ring diameter of $\frac{3}{16}''$ a resistance between about 24 and about 26 ohms is preferred while for a 12 volt system a resistance of from about 54 ohms to about 56 ohms is preferred. The idea is to provide for the opening of the air valve when the voltage in the electrical system has risen to about seven volts and the vacuum in the manifold has dropped substantially, say from 21 inches to about 15 inches.

When the engine is at rest the air valve in the bottom of the body is closed by the armature 14 which, as pointed out above, is held lightly in contact with the valve seat 13 by means of the spring 17. When the motor is idling there is a comparatively high vacuum in the intake manifold usually, around 21 inches and thus the armature or closure element 14 is held very firmly in valve closed position by atmospheric pressure on the outer side thereof; the effective pressure of course depending on the degree of vacuum in the intake manifold and also upon the cross-sectional area of the valve passage. For ordinary passenger vehicles this passage may be about $\frac{3}{16}''$ in diameter and the tube 10 may be about $\frac{1}{4}''$ outside diameter which will provide an inside diameter of about $\frac{3}{16}''$.

The function of the electromagnet is to place the correct magnetic pull on the armature 14 to overcome the atmospheric pressure which holds the armature or valve closure element 14 against its seat.

It will be apparent that, when a vacuum exists in the intake manifold the same degree of vacuum will exist in the space 8 in the body 7, and the function of this space, which is quite important, is to provide, after the voltage of the electrical system has risen slightly above the normal battery voltage, a momentary or short delay after the valve in the body opens before a full flow of air takes place through the tube 10 into the manifold.

In operation, when the motor is first started a comparatively high vacuum, usually better than 20'', is formed in the intake manifold and also in the space 8 and in the tube 10. At low engine speeds the output from the generator 28 is low, the voltage of the battery is also low when it is cold, and, due to the regulator 30 the generator is not connected to the battery because the circuit breaker is open. However, as the motor warms up and its speed is increased, the voltage of the generator, which is driven thereby, also increases with the speed. During this period my valve remains closed and the engine is operating on the normal mixture provided by the carburetor. However, as the throttle is opened the vacuum in the intake manifold and the space 8 is reduced which reduces the effectiveness of the atmospheric pressure holding the air valve in closed position, thus requiring less magnetic pull to draw the armature 14 away from the position shown in Fig. 1 to open the air valve in the bottom of the body 17. As the voltage of the generator rises the circuit breaker closes and the points 38 are brought together thus establishing a circuit between the generator and the battery and also placing the electromagnet across the terminals of the battery.

As the throttle is opened, the vacuum reduced in the space 8, and the air valve in the bottom of the body 7 opened, there is a slight delay before air flow equilibrium is established through the valve into the intake manifold thus giving the engine an opportunity to accelerate before the ratio of air and gas in the fuel mixture is changed. This delay would not occur if the tube 10 communicated directly with the valve 13 so that air could pass directly through the tube 10 to the manifold immediately upon the opening of the valve 13. The space 8, however, which provides more or less indirect communication between the tube 10 and the outside atmosphere does produce the desired delay, due perhaps, to turbulence therein created by the inrush at high velocity of air through the valve 13 as it opens. This inrush of air, initially, is in the form of a jet at right angles to the direction of air flow in tube 10. Furthermore, while the space 8 does effect an initial delay in the flow of air into the manifold it does not thereafter, restrict the flow of air, as would be the case if the same space were distributed throughout a long tube because the body 7 is compact and the cross sectional area of the space 8 is comparatively large.

When the motor is decelerated by closing the throttle, it is quite important that the air valve close, otherwise the normal idling mixture will be diluted and the engine stalled due to too lean a mixture. When the motor is reduced to idling speed the generator output falls and the circuit breaker should open, thus closing the air valve. Sometimes, however this does not occur instantly and hence I have shown two means either of which will insure the closing of the air valve. When the brakes are applied to the vehicle to stop or decelerate it the throttle is of course closed, and the stop light will be illuminated by the closing of the switch 33 which is associated with the brake pedal (not shown). When this switch is closed it will be apparent that both terminals of the electromagnet 23 are connected to the same terminal of the battery and thus, being short circuited, the electromagnet will release the armature 14 and close the air valve.

In Fig. 4 I have illustrated an inertia operated switch in which the actuating element is a pendulum 40 pivotally mounted to swing freely at 41. One terminal 42 is provided on the pendulum which is grounded and another terminal 43 adapted to cooperate with the terminal 42 is secured to the resilient arm 44. The terminals 42 and 43 are normally held in electrical contact by the light spring 45 the tension on which may be adjusted by the adjusting nuts 46. By connecting the terminal 26 on the electromagnet to the binding post 47 which is electrically connected to the contact 43 it will be apparent that this terminal of the electromagnet is thus normally connected to the negative or grounded battery terminal in much the same manner as it is connected through the filament 32 of the stop light, as shown in Fig. 2. The arrow on the pendulum 40 indicates the direction in which the vehicle to which the device is attached is moving. Hence, when the forward motion is decelerated, the pendulum 40, due to its intertia, will swing forward in the direction of the arrow and break the circuit through the electromagnet and the battery to effect a closure of the valve.

Careful tests of my air valve on various motor vehicles have indicated an average increase of about 18% in gasoline mileage and 6% in power, and an increase in the top speed of the engine of from 5 to 7 miles per hour.

The device is easily applied to any engine and no changes in carburetor or other adjustments are necessary.

While I have described my invention in its preferred embodiment it is to be understood that the words which I have used are words of description rather than of limitation and that changes within the purview of the appended claims may be made without departing from the true scope and spirit of my invention.

What I claim is:

1. A device for admitting auxiliary air to the intake manifold of an internal combustion engine comprising in combination, a compact body enclosing a space of compartively large cross section and volume, a pipe of comparatively small cross sectional area communicating with said space and having an outlet adapted to be placed in direct communication with said manifold to provide for the flow of air from said space through said pipe directly into said manifold, a valve having an air passage of comparatively small cross sectional area for the flow therethrough of circumambient air into said space at a point relatively remote from the point of communication of said pipe therewith, means actuated by atmospheric pressure for closing said valve when the speed of said engine is decelerated, and an electromagnet for actuating said means to open said valve, when the speed of said engine is accelerated; whereby when said valve is closed and said engine is operating at low speed a partial vacuum will be developed in said space and when said valve is thereafter opened by the speeding up of said engine the existence of said partial vacuum in said space will effect a momentary delay in the flow of air through said pipe from said space to said manifold and stalling of said engine due to too lean a mixture will be prevented.

2. A device for admitting auxiliary air to the intake manifold of an internal combustion engine comprising the combination with a pipe of comparatively restricted cross sectional area adapted to be placed in direct communication with said manifold, a valve having an air passage therethrough of comparatively restricted cross sectional area, means actuated when the speed of said engine is accelerated for opening said valve for the passage of circumambient air therethrough, and means forming an air chamber of comparatively large cross sectional area and volume providing communication therethrough between said pipe and the passage through said valve; whereby when said valve is closed and said engine is operating at low speed a comparatively high vacuum will be developed in said air chamber which, when said valve is suddenly and fully opened, will cause a delay in the establishment of a full flow of air from said chamber through said pipe into said manifold until air pressure equilibrium is established in said chamber.

3. In a device adapted to admit auxiliary air to the intake manifold of an internal combustion engine of a motor vehicle having a generator driven by said engine, a battery charged by said generator, and a relay for closing and opening the circuit between said battery and generator, the combination with a compact body enclosing a space of comparatively large cross sectional area and volume, of a pipe of comparatively small cross sectional area communicating with said space and having an outlet in direct communication with said manifold to provide for the flow of air between said space and said manifold, a valve having an air passage therethrough of comparatively small cross-sectional area for admitting atmospheric air to said space at a point relatively remote from the point where said pipe communicates therewith, an electromagnet for opening said valve; said magnet being electrically connected across the terminals of said battery by said relay when closed, and inertia actuated means for breaking the circuit through said magnet when said vehicle is decelerated to close said valve irrespective of the position of said relay; whereby when said valve is closed by the deceleration of said vehicle a partial vacuum will be created in said space which, when said valve is thereafter opened, will effect a momentary delay in placing said manifold in communication with the atmosphere and stalling of said engine due to too lean a mixture will be prevented.

4. In a device adapted to admit auxiliary air to the intake manifold of an internal combustion engine of a motor vehicle having a generator driven by said engine, a battery charged by said generator, a relay for closing and opening the circuit between said battery and generator, a stop light and a circuit, including a switch, connecting said light and battery, the combination with a compact body enclosing a space of comparatively large cross sectional area and volume, of a pipe of comparatively small cross sectional area communicating with said space and having an outlet in direct communication with said manifold to provide for the flow of air between said space and said manifold, a valve having an air passage therethrough of comparatively small cross sectional area for admitting atmospheric air to said space at a point relatively remote from the point where said pipe communicates therewith, an electromagnet for opening said valve; said magnet being electrically connected across the terminals of said battery in series with the filament of said stop light when said relay is closed and said stop light switch is open; whereby when said vehicle is braked and said stop light switch is closed the circuit through said magnet will be neutralized, said valve will close and a partial vacuum will be developed in said space which, when said valve is thereafter opened, will effect a momentary delay in placing said manifold in communication with the atmosphere, and stalling of said engine due to too lean a mixture will be prevented.

JOHN F. DECKER.

REFERENCES CITED

The following references are of record in the file of this patent:

UNITED STATES PATENTS

| Number | Name | Date |
|---|---|---|
| 1,711,767 | Barden | May 7, 1929 |
| 2,115,878 | Rodman | May 3, 1938 |
| 1,360,547 | Loetscher | Nov. 30, 1920 |
| 436,219 | Deeds | Sept. 9, 1890 |
| 1,513,142 | Webb | Oct. 28, 1924 |
| 1,777,971 | Huffam et al. | Oct. 7, 1930 |
| 2,243,354 | Musser | May 27, 1941 |
| 2,161,411 | Erich | June 6, 1939 |
| 1,805,147 | Murray | May 12, 1931 |
| 1,673,824 | Hoeschen | June 19, 1928 |
| 1,823,866 | Verna et al. | Sept. 15, 1931 |
| 1,977,518 | Mallory | Oct. 16, 1934 |
| 2,081,425 | Taber | Oct. 22, 1935 |
| 1,622,811 | Schatz | Mar. 29, 1927 |

FOREIGN PATENTS

| Number | Country | Date |
|---|---|---|
| 128,193 | Great Britain | Aug. 7, 1919 |
| 191,952 | Great Britain | Jan. 25, 1923 |
| 583,521 | Germany | Sept. 5, 1933 |